Figure 6:
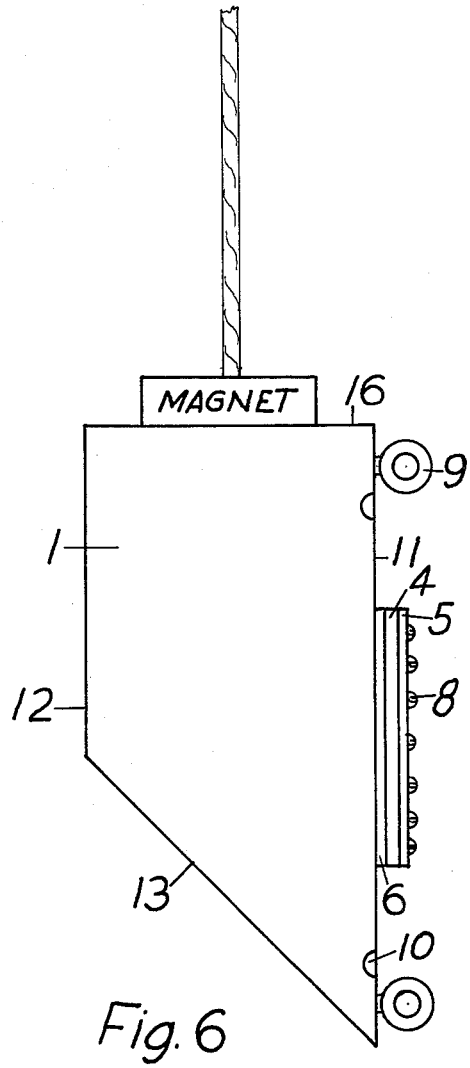

June 28, 1966  A. A. HIRSCH  3,257,893
SELF-LUMINOUS TURBIDITY OBSERVATION DEVICE FOR
WATER WORKS BASINS
Filed May 1, 1961  3 Sheets-Sheet 1
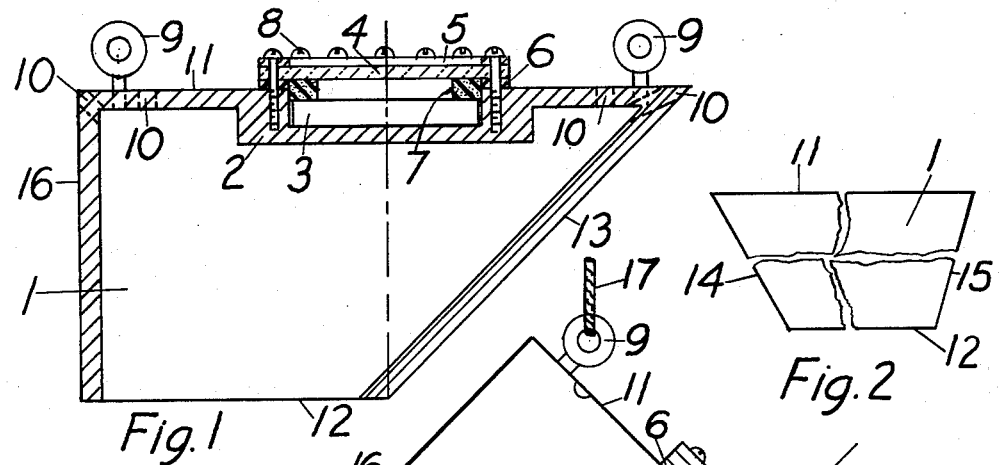
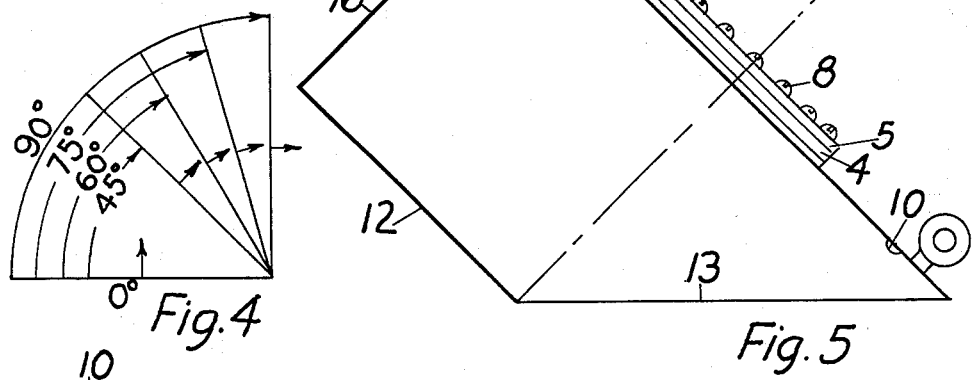
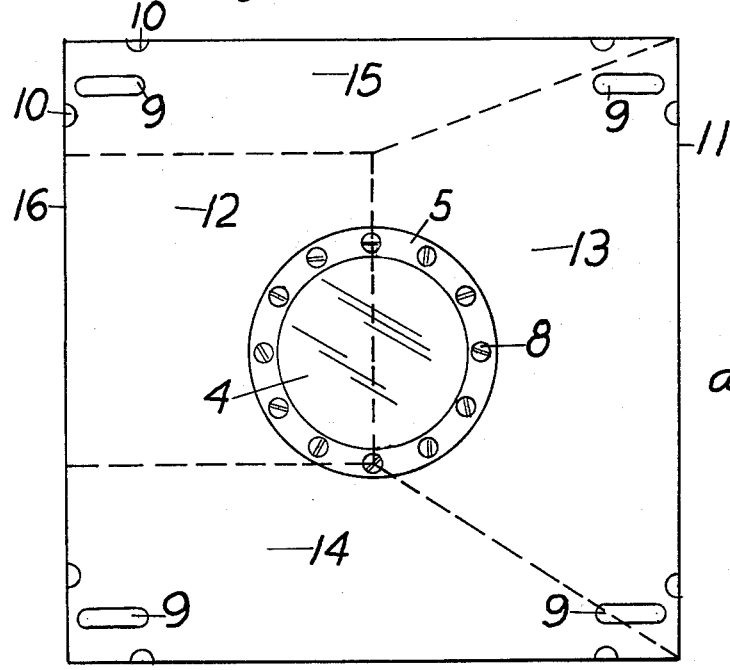
INVENTOR.

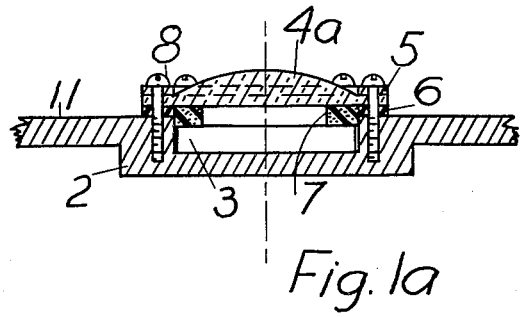
Fig. la

June 28, 1966     A. A. HIRSCH     3,257,893
SELF-LUMINOUS TURBIDITY OBSERVATION DEVICE FOR
WATER WORKS BASINS Filed May 1, 1961     3 Sheets-Sheet 3

United States Patent Office 3,257,893
Patented June 28, 1966

3,257,893
SELF-LUMINOUS TURBIDITY OBSERVATION
DEVICE FOR WATER WORKS BASINS
Abraham Adler Hirsch, 141 Norwood St.,
Shreveport, La.
Filed May 1, 1961, Ser. No. 106,913
2 Claims. (Cl. 88—14)

The present invention relates to a self-contained submerged luminous target for observing the residual turbidity of water undergoing treatment in basins prior to filtration for municipal and similar uses. It is likewise useful for checking the clarity of finished waters in clear water reservoirs. A device for this purpose which is viewable any time at will, and which eliminates the need for power connections and maintenance is a distinct aid in water plant operation.

Submerged observation targets heretofore have been either electric light bulbs sealed in waterproof fixtures or marked spots having graphic detail for viewing, being illuminated by some conventional light source. Outside connection in either case for electric current is necessary, and the device is switched on and off as needed.

The object of subject invention is to provide a self-luminous target for turbidity observations of water in basins and reservoirs which is completely self-contained and self-sufficient, thereby eliminating the need of outside connections or of power packs for electric current. An advantage of such an apparatus is that the need for switching on and off is avoided and the self-luminous target, being distinguishable continuously, is available for viewing constantly.

A further object of this invention is to describe a device which may be deposited within a basin or reservoir after which the means used in lowering can be removed completely, so as to isolate the device out of reach from unauthorized persons. A method for retrieval, when required, is described.

Another object of this invention is to provide a choice in the orientation of the self-luminous light source, so as to illuminate the water at different angles according to whether direct perpendicular sighting or diffuse sidewise penetration of the beam is desirable, or according to the relative positions of target and observer.

The several objects of the invention are achieved by employing a sealed radioisotope excited phosphor disc as the source of light, mounting same on a specially contrived unsymmetrical right frustrum of a 4-sided pyramid. The angles of the sides with the bases are all different thereby permitting four differently sloped positions of the top on which the light is mounted. Eyebolts in the top for lowering the assembly to rest in a basin allow a choice of whichever side is to be used for fixing the direction of the beam. Isolation is accomplished by unthreading the twine used in lowering through the eyebolts selected for suspension. Finally, the assembled target, made of steel sides is retrieved whenever desired by lowering a strong magnet to make contact, and then raising the assembly to the surface.

Details of the invention are illustrated in the accompanying drawings in which FIGURE 1 is a vertical section to show the details of construction, FIGURE 1a is a vertical partial section of the top portion of FIGURE 1 to show an alternative detail. FIGURE 2 is a schematic elevation to show the two remaining sides not indicated in FIGURE 1, FIGURE 3 a top view to show the aspect ordinarily seen by an observer looking down vertically on the top of FIGURE 1, FIGURE 4 a diagram showing the various orientations possible, FIGURE 5 a tilted vertical elevation to illustrate one of these possible orientations and FIGURE 6 an elevation showing the method of retrievals. Throughout all views a given identifying numeral indicates the same element of structure.

Referring to FIGURE 1, 1 is a hollow body, with steel sides open at the bottom, provided with a recess 2 on the top surface, in which is set a radioisotope exicited light source 3 under a plate glass cover 4. The glass cover and light source are held in position watertight under retainer 5 by means of ring gasket 6 and sponge rubber packing 7. A set of screws 8 fasten the retaining ring 5 to body 1. Eye screws 9 in the top of the steel body allow insertion of twine for lowering the assembly into position. The choice of which pair of holes to use depends on which oblique surface, such as 13, is selected for the block to rest on. Holes 10, drilled diagonally through the edges of the body, release air from the interior of the shell of the body 1 during the act of submergence, to eliminate buoyancy.

The surfaces of the hollow body or block 1 are designated as top 11, bottom 12, and the sides as 13, 14, 15 and 16. These form angles of 45°, 60°, 75° and 90° with base 12, respectively.

In cases where concentration of the light beam from the luminous source 3 is desired, the glass cover 4 may be replaced by a converging lens 4a as shown in FIGURE 1a.

FIGURE 2 is a schematic elevation of block 1, rotated 90° horizontally around its vertical axis, showing the other two alternative sides 14 and 15, not indicated in the view of FIGURE 1. In this view the body is still resting on its open base which is parallel to the top 11.

FIGURE 3 shows the assembly as viewed from directly above the top surface 11 of the block. The dotted lines show the outline of the bottom surface 12 and those of the oblique edges of sides 13, 14 and 15. The angles which these sides make with the top and bottom planes are all different so that by resting the body on any of these a different inclination of the light beam is obtained.

FIGURE 4 indicates it is thus possible to point the light beam vertically, 75°, 60°, 45° and 0° from horizontal, respectively.

FIGURE 5 shows the body submerged in a tank resting on its side 13. This view of the luminous target is to be selected for observation somewhat at a distance from the vertical. The block has been lowered into place by means of twine 17 which passes through the pair of eyebolts along the edge of the block opposite side 13. The assembly is then detached by pulling one end of the string, releasing the other end, thereby permitting it to unthread through the eyebolts.

FIGURE 6 illustrates the principle of raising the target assembly to the surface by means of a strong magnet attached to the end of a cord.

In using light from this source the quality of the turbidity in the water is judged from the intensity and sharpness of the image, or by the diffuse area surrounding the light. When viewed obliquely the beam is also observed for illumination of the suspended particles.

According to the radioisotope used to excite the phosphor the luminosity half life is 12.5 years in the case of tritium, $H^3$, and 9.4 years in the case of krypton, $Kr^{85}$. Lucite shielding requirements directly over the luminous surface are 10 mils and ⅛ inch thickness, respectively. Use of these articles do not present a radiation hazard as protected.

Other angles between the sides and base of the block than those illustrated in FIGURES 1, 2 and 4 may be used when circumstances so indicate. Other radioactive exciters may be employed as they become available.

I claim:

1. A permanent, self-luminous, selectively directionable observation target for submergence in a water reservoir or tank for the purpose of monitoring turbidity consisting of the combination of a substantially permanent radioisotope excited light source, a block having sides defining a polyhedron, said light source positioned in a recess in an outside surface of a first one of said sides, said block being made of magnetizable material whereby magnetic retrieval may be effected, a transparent cover, means preventing the entry of water into said recess and securing said cover to said block over said recess, means for overcoming floatation, and means located on said block for detachably securing lowering means whereby said block may be selectively positioned in a water reservoir or tank on a second one of said sides.

2. A permanent, self-luminous, selectively directionable observation target according to claim 1 in which said transparent cover is a converging lens.

References Cited by the Examiner

UNITED STATES PATENTS

| | | | |
|---|---|---|---|
| 512,381 | 1/1894 | Keyes. | |
| 1,232,898 | 7/1917 | Smith | 88—14 |
| 1,635,470 | 7/1927 | Exton | 84—14 |
| 1,833,241 | 11/1931 | Wright. | |
| 2,218,789 | 10/1940 | Gerber | 250—72 XR |
| 2,285,440 | 6/1942 | Kaiser | 250—106 |
| 2,910,593 | 10/1959 | Laing et al. | 250—72 XR |

JEWELL H. PEDERSEN, *Primary Examiner.*

EMIL G. ANDERSON, *Examiner.*

T. L. HUDSON, *Assistant Examiner.*